Dec. 1, 1970  G. JONES  3,544,180
BEARINGS
Filed Nov. 18, 1968  2 Sheets-Sheet 1

Inventor
Gwilym Jones
By Watson, Cole, Grindle & Watson
Attorneys

Dec. 1, 1970  G. JONES  3,544,180
BEARINGS
Filed Nov. 18, 1968  2 Sheets-Sheet 2

Inventor
Gwilym Jones
BY Watson, Cole, Grindle & Watson
Attorneys 3,544,180
BEARINGS
Gwilym Jones, Brongwynedd, Pencaenewydd,
Pwllheli, Wales
Filed Nov. 18, 1968, Ser. No. 776,330
Int. Cl. F16c 17/00
U.S. Cl. 308—237                                3 Claims

ABSTRACT OF THE DISCLOSURE

The invention relates to bearings in the form of split bushings either independently or in combination with a housing. The split bushing comprises a cylindrical tubular body having a compensation gap extending wholly or partially across the axial length of the bushing to allow radial deformation of the bushing and expansion and contraction of the bushing relative to the housing, and the split bushing is provided with a locating lug extending from the periphery of an oil hole formed in the bushing. The locating lug is engageable within a lubricant supply passageway of the housing so as to locate the split bushing relative thereto whilst permitting of required lubricant flow.

---

This invention relates to bearings and is concerned in particular with the bushings thereof either independently or in combination with a housing.

This invention particularly relates to a split bushing which is referred to herein as of the kind specified, and is defined as a bushing formed of resiliently deformable metal, plastic or other material adapted to be mounted within a housing having a lubricant supply opening or passageway, and in which bushing a journal, gudgeon, pivot, pin or other part is arranged to revolve, oscillate or slide with lubricant being supplied from said housing opening or passageway through a hole or opening formed in the bushing to the bearing surface thereof, the bushing further including a compensation gap extending wholly or partially across the axial length of the bushing in a direction either parallel or inclined to the bushing axis, such compensation gap permitting of the radial deformation of the bushing for assembly into the housing, and expansion and contraction of the bushing relative to the housing. The compensation gap aforementioned is commonly in the form of a split extending through the bushing across the entire axial length thereof, however the compensating gap may be constituted by a slot extending partially across the length of the bushing which slot, if desired, may be formed in a portion of the bushing of reduced thickness so as to more readily permit of the radial deformation of the bushing.

A split bushing of the kind specified must be located relative to the housing so as to ensure the register of the lubricant supply opening or passageway of the housing with the hole or opening in the split bushing, and this location once achieved on fitting the split bushing in the housing must be maintained during the service life of the split bushing.

The location of a split bushing of the kind specified is most commonly achieved by the interference fit of the split bushing in the housing. Such interference fit is obtained by press fitting the split bushing into the housing by applying an axial load to the split bushing, and in service relative movement of the split bushing constrained in the housing is prevented by radially acting forces between the split bushing and the housing, and thus the split bushing has to have a certain degree of radial stiffness.

Because of the characteristics of certain bearing materials, notably plastics, the compensation gap is essential but this has the effect of severely reducing the radial stiffness of the split bushing so that an interference fit cannot be obtained.

The compensation gap is necessary with plastics and some metal bearing materials to accommodate differences in thermal expansion between the housing and bushing material. If such compensation gap were not provided then where the bushing material expands at a greater rate than the housing material, the bore of the bushing would be reduced due to the constraining effect of the housing. Certain plastic bearing materials also absorb moisture which could cause reduction in the bore of the bushing in service, thus the compensation gap is essential. Lastly, plastic bushings made by a moulding process are subject to relaxation of stresses set up during the moulding process, and this causes contraction or radial distortion of the bushing which has to be accommodated by a compensation gap.

Furthermore, to be suitable for press fitting a split bushing of the kind specified has to be made of a tough material to withstand the stresses set up during assembly and retention in the housing, for instance, a split bushing of the kind specified formed of a frangible or brittle material, or a material not sufficiently resilient to resist the relatively large axial loads applied to a split bushing during press fitting cannot be pressfitted to obtain such interference fit essential to the location of the split bushing.

Accordingly, for the foregoing reasons as well as others which are known to those skilled in the art, there are many kinds of split bushings of the kind specified that cannot be located in their housings by interference fit. Alternative locating means have therefore to be employed and these all require additional machining of the housing, and often the provision of ancilliary parts as well as the split bushings being formed with complementary locating means that have to be designed for each individual application and thus cannot be of substantially universal use.

The use of special locating means as aforedescribed increases the cost of manufacture of both the housing and the bushing, and the cost of assembly.

An object of the present invention is to provide a bushing of the kind specified with means for locating the split bushing within the housing in which it is adapted to be mounted.

A further object of the present invention is to provide such locating means for a split bushing of the kind specified without substantially increasing the cost of the bushing, the cost of assembly, and without any modification being necessary to the housing in which the bushing is adapted to be mounted.

According to the present invention I provide a split bushing of the kind specified characterized in that the split bushing is formed on that face which is adapted to be adjacent the housing with at least one lug or projection extending from at least part of the periphery of the hole of the split bushing which is adapted to register with the lubricant supply opening or passageway in the housing, the lug or projection being adapted to locate the split bushing in the housing by engaging within said supply opening or passageway and having such a configuration so as to permit flow of lubricant through said supply opening or passageway through the bushing hole to the bearing surface thereof.

The lug or projection provides an abutment face for engaging with at least part of the internal periphery of the housing lubricant supply opening or passageway. The dimensions of the lug or projection must be selected so as to ensure that the flow of lubricant through the supply opening or passageway is not substantially reduced as adequate lubricant must be able to flow through the hole in the split bushing to the bearing surface thereof in accordance with operative conditions of the split bushing.

The split bushing of the present invention therefore is located in the housing by means of the lug or projection engaging within the lubricant supply opening or passageway conventionally provided in the housing, and thus no machining is required to the housing involving additional costs such as is the case where a split bushing cannot be located satisfactorily by an interference fit.

In addition, such lug or projection of the split bushing may be provided by the conventional mass production techniques used for split bushings of the kind specified so that there is little or no increase in the cost of manufacturing the split bushings according to the invention.

Furthermore, another important advantage of the split bushings according to the present invention over all other forms of location, including interference fit, is that correct alignment of the hole in the bushing and the lubricant supply opening or passageway in the housing is automatically achieved and maintained.

In the case of a split bushing formed of a resiliently deformable material but with which a reliable interference fit cannot be achieved or maintained, a split bushing according to the present invention may be press fitted in the housing in the normal manner with the lug or projection on engaging within the lubricant opening or passageway of the housing locating the split bushing in the desired position, thus once the split bushing has been inserted into the housing there is no need for special machining or drilling to provide the hole in the bushing through which lubricant must be supplied to the bearing surface of the split bushing.

In the case of a split bushing of the kind defined made entirely of plastics material, the resiliency of the plastics material may be sufficient to enable the split bushing to be snapped or sprung into the housing with the lug or projection locating the split bushing as aforedescribed.

One conventional form of split bushing of the kind specified to which the present invention may be applied is commonly referred to as a wrapped bush. Such wrapped bushes are formed from a length of flat bearing material which is wrapped around a former so that the opposed ends of the material are adjacent and provide a slit which extends either in a direction parallel to the axis of the former or in a helical or inclining direction in relation to the axis of the former.

A split bushing according to the present invention may be formed from plastics material by moulding, e.g., injection moulded, or may be wrapped from a length of plastic material in a similar manner as aforedescribed with, if necessary, the additional step of applying heat.

Preferably, the lug or projection tapers towards its outer end so as to provide the lug or projection with a radially inclined abutment face adapted to engage with the internal wall of the lubricant supply opening or passageway in the housing, such inclined abutment face facilitating the insertion, removal and correct location of the split bushing of this invention.

Where it is desired that the compensation gap is such that there is little or no space between the edges of the split, it is preferable that the split should extend in a helical or inclined direction to the axis of the bushing, whereby the radially inward deformation of the split bushing necessary for insertion into the housing is effective over a major part of circumference. With the form of split bushing in which the split extends parallel to the axis of the split bushing such radially inward deformation may only be possible over a minor part of the split bushing circumference, for example, an arc of only 90°, and such limited deformation with a small compensation gap may preclude the satisfactory fitting of the split bushing.

With split bushings as aforedescribed it is also preferable that the lug or projection is situated near to the split where the greater degree of radially inward deformation occurs on fitting and removal, such deformation being assisted by the engagement of the inclined abutment face of the lug or projection with the housing during relative movement of the bushings as is described later in more detail.

A further preferable feature of split bushings in accordance with the present invention is that adjacent edge portion of the bushing may extend in similar directions inclined to the radial direction as this permits of a greater degree of deformation of the split bushing, even to the extent of adjacent ends overlapping.

Where the split of the bushing is in the form of a slot as aforereferred to this may extend parallel or inclined to the axis of the split bushing.

Conventionally the lubricant supply means or passageway in the housing is of circular section, and therefore it is also preferred that the lug or projection is part-circular in section or part-conical so as to ensure continuous engagement of the abutment face with the internal face of said supply opening or passageway. Furthermore, part-conical sections and part-circular configurations are more easily formed by mass production manufacturing techniques.

Conveniently, the invented bushing may be manufactured so as to have the dimensions as prescribed in the British Standard Specification No. 1131, part 2, entitled "Dimensions of Wrapped Bushes and Thrust Washers." The locating lug or projection would be placed centrally with respect to the axial length of the bushing so that it would fit all housings having a central opening or passageway and designed to accept bushings of the kind defined having the dimensions of the aforementioned British Standard Specification No. 1131.

Other features of the present invention will be apparent also from the following description in which various embodiments of the present invention are described with reference to the accompanying drawings wherein.

Figure 1:
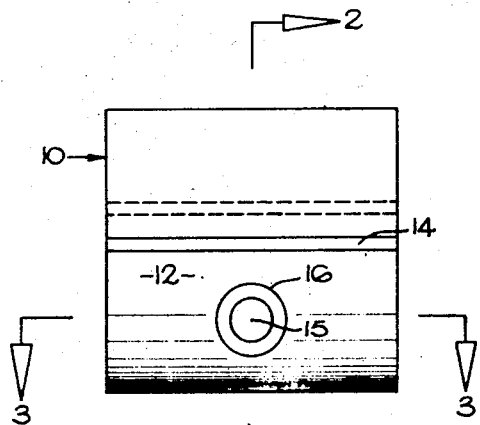
FIG. 1 is a plan view of one form of a split bushing according to the present invention.

Referring firstly to the drawings of FIGS. 1, 2, 3 and 4, the split bushing 10 is of the kind specified and comprises a length of resilient deformable bearing material wrapped in known manner so as to be of cylindrical form having an internal bearing face 11 and an external face 12 adapted to engage with the complementary face of a housing 9 (shown schematically) having a lubricant supply passageway 8.

The adjacent end faces 13a and 13b of the length of bearing material are each similarly inclined relative to the radial direction so that the compensation gap constituted by the slit 14 is formed by the space between the end faces 13a and 13b and extends inclined relative to the radial direction.

The split bushing is therefore capable of a greater amount of inward deformation so as to reduce the peripheral length of the bushing for insertion in and removal from the housing, than would be the case if the split were not so inclined. The inclined split also permits of, if necessary, the split bushing being radially deformed by an amount such that the adjacent end portions of the length of bearing material overlie one another.

The split bushing 10 is provided with a circular oil hole 15 positioned centrally of the axial length of the bushing; from the periphery of the hole there extends outwardly from the external face 12 of the bushing 10, a locating lug 16 of truncated conical form through which the oil hole 15 extends in concentric relationship.

Figure 2:
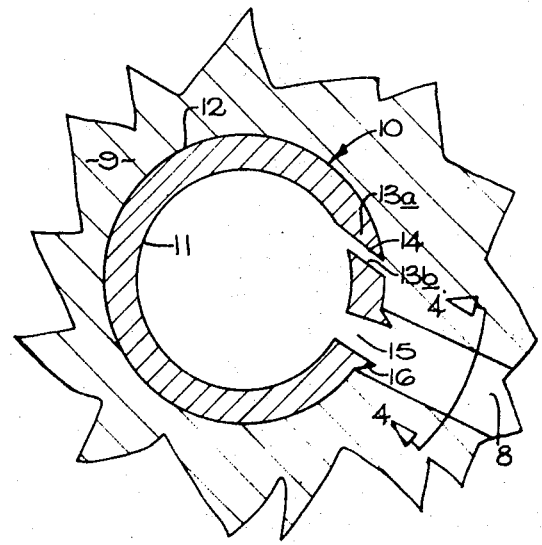
FIG. 2 is a sectional view of the split bushing depicted in FIG. 1 as fitted in a housing, the view of the bushing being generally on line 2—2 of FIG. 1.
Figure 3:
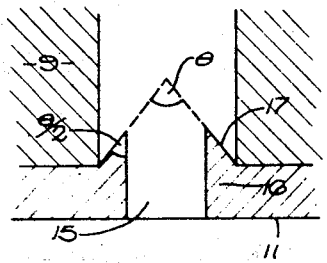
FIG. 3 is an enlarged view on line 3—3 of FIG. 1 and including the housing.
Figure 4:
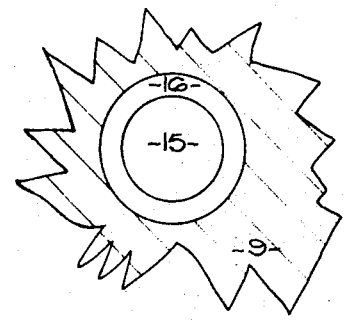
FIG. 4 is an enlarged view on line 4—4 of FIG. 2.
Figure 5:
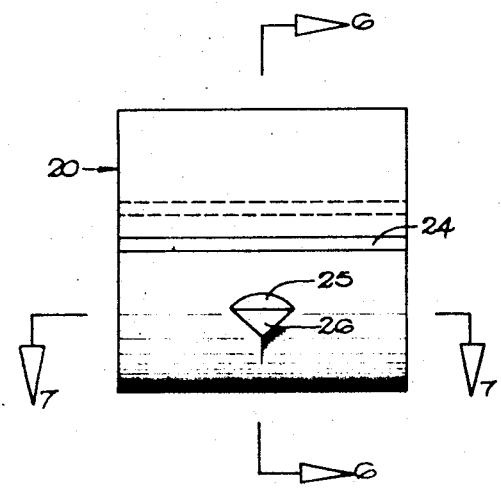
FIG. 5 is a plan view of a further form of split bushing according to the present invention.
Figure 6:
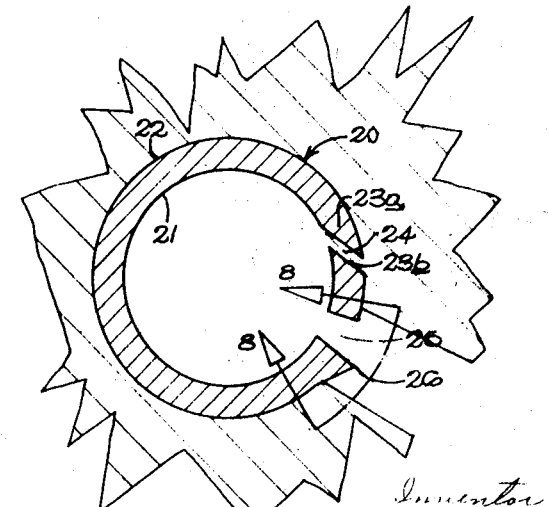
FIG. 6 is a sectional view of the split bushing depicted in FIG. 5 as fitted in a housing, the view of the bushing being generally on line 6—6 of FIG. 5.

As can be seen from the drawings of FIGS. 2 and 3, the lug 16 is of tapering section having a part-conical abutment face 17 which is adapted to engage with the internal wall of the lubricant supply passageway 8 formed in the housing 9.

The oil hole 15 is in register with the nonobstructed part of the opening or passageway formed in the housing so that lubricant may flow through the passageway 8 in the housing 9 to the bearing surface 11 of the split bushing 10.

The oil hole 15 and the locating lug 16 are disposed at a position near to the slit 14, that is, in that end portion which would be displaced inwardly relative to the housing by a greater amount during fitting or removal of the bushing.

During the insertion of the split bushing 10 into the housing the abutment face 17 of the lug 16 will bear against the internal wall of the housing so as effectively to assist in the radially inward deformation or displacement of the split bushing, and subsequently ensure that the split bushing is correctly positioned on engagement with the lubricant supply opening or passageway.

When the split bushing is to be removed from the housing the conical abutment face 17 act to displace the split bushing radially inwards during axial movement of the split bushing under load.

To obtain the best conditions for such radial displacement or deformation of the split bushing by the action between the conical abutment face 17 of the lug 16 and the internal wall of the lubricant supply passageway 8 and the housing 9, the apex angle $\theta$ of the whole cone, as is projected and shown in dotted lines in FIG. 3 should be such than $\tan \theta/2$ is greater than $\mu$ where $\mu$ is the coefficient of friction between the material from which the lug 16 and the material in which the lubricant supply opening are respectively formed.

Furthermore, so as to prevent any tendency for the lug to be displaced due to circumferential forces acting on the bushing during the rotation or relative movement of the part acting on the bearing surface 11, e.g., journal, shaft; and secondly, to allow for maximum height of the lug for a given ratio of apex to base diameter which in turn determines the extent to which the lug obstructs the lubricant supply opening or passageway, the apex angle $\theta$ should be as small as possible.

Referring now to the drawings of FIGS. 5, 6, 7 and 8, the general form of the split bushing 20 is similar to that of the aforedescribed embodiment having an internal bearing face 21, an external face 22 adapted to engage with the complementary face of the housing and a radially inclined slit 24 formed by the space between the end faces 23a, 23b of the length of the bearing material.

The split bushing 20 is provided with an oil hole 25 positioned centrally of the axial length of the bushing. The hole 25 is of semicircular section, and extending from that part of its periphery corresponding to the diameter there is formed a locating lug 26 extending from the external face of the bushing 20.

Figure 7:
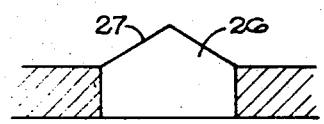
FIG. 7 is an enlarged view on line 7—7 of FIG. 5.
Figure 8:
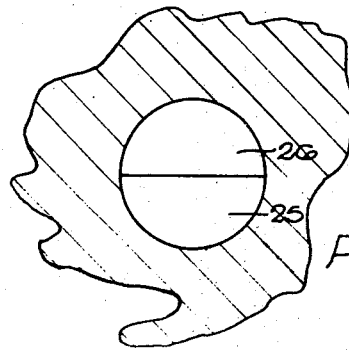
FIG. 8 is an enlarged view on line 8—8 of FIG. 6.

As can be seen from the drawing of FIG. 7 in particular the lug 26 is of semiconical section so as to provide a lug of tapering section having a semiconical abutment face 27 which is adapted to engage with part of the internal wall of a lubricating opening or passageway formed in the housing.

The split bushing 20 is adapted to be fitted in the housing in a similar manner as aforedescribed with reference to the first embodiment of the present invention. Similarly, the inclined abutment face 27 of the lug 26 during the insertion and removal of the split bushing will assist in the radially inward deformation of the split bushing.

Insofar as the cone angle of the lug is concerned, similar considerations as aforementioned must be taken into account to obtain the best possible location.

With reference to the other embodiments diagrammatically shown in FIGS. 9, 10, 11, 12 and 13, each of these will now be described in turn.

Figure 9:
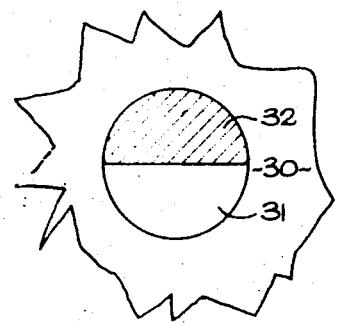
FIGS. 9, 10, 11, 12 and 13 depict various different forms of locating lugs or projections and each are sectional views of the locating lug as seen through a circular section lubricant supply opening or passageway in the housing.

With reference to the embodiment shown in FIG. 9 the housing 30 is provided with a circular oil passageway 31. The lug 32 extending from the periphery of an oil hole in the split bushing is of semicylindrical configuration and the semicircular side thereof engages with a semicircular part of the internal passageway 31.

Figure 10:
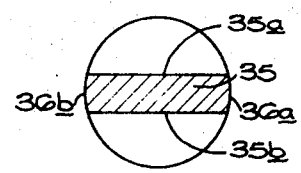

With reference to FIG. 10 the oil hole formed in the split bushing would be constituted by two part circular openings from between which extends a dependent lug 35 extending outwardly from the external face of the split bushing. The lug 35 has two parallel sides 35a, 35b, and the part circular sides 36a and 36b constitute the abutment face engaging with the internal wall of the opening or passageway formed in the housing.

Figure 11:
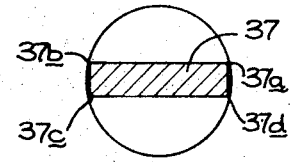

The embodiment of the FIG. 11 is very similar to that of FIG. 10 except that the lug 37 has a rectangular section and only the corners 37a, 37b, 37c, 37d of the dependent lug 37 engage with the internal wall of the opening or passageway within the housing.

Figure 12:
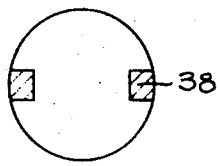
Figure 13:
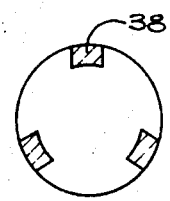

With reference to the embodiments depicted in FIGS. 12 and 13, these two embodiments are very similar. In each embodiment the oil hole in the bushing would be of substantially circular configuration from the periphery of which extend small square or rectangular section lugs 38 extending outwardly from the external face of the bushing so as to engage within the opening or passageway formed within the housing.

Figure 14:
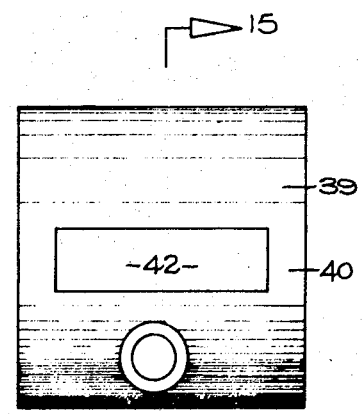
FIG. 14 is a plan view of a split bushing having the same form of lug as depicted in the embodiment of FIGS. 1, 2, 3 and 4, but having an alternative form of compensation gap.
Figure 15:
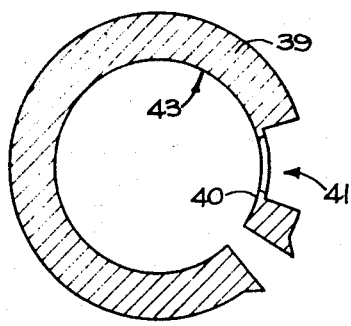
FIG. 15 is a section on line 15—15 of FIG. 16.

Referring now to the alternative form of split bushing as depicted in FIGS. 14 and 15, the bushing comprises a cylindrical body 39 of plastics bearing material which is provided with locating means of the type aforedescribed with reference to FIGS. 1, 2, 3 and 4.

The body 39 is provided with a portion 40 of reduced thickness extending across the axial length of the bushing, such thinner section being formed by the recess 41 in the back face of the bushing which abuts against the housing. The portion 40 is formed with a central slot 42 extending through the bearing material and accordingly, only partially interrupting the bearing surface 43 of the bushing as opposed to the complete interruption which occurs in the first and second embodiments previously referred to.

The thinner portion 40 together with the slot 42 permits of the necessary radial deformation of the split bushing required for assembly, and further permits of thermal expansion and contraction.

There are many advantages obtained by the present invention of which the most important is the possible use of bearing materials for bushings which have not been considered practical before because they have not been capable of being located by an interference fit, or of withstanding the high axial loads of press fitting required to obtain a good interference fit. In particular, the present invention is suitable for aluminum bearing materials.

In relation to the various embodiments of the lug or projection form as aforedescribed the preferred embodiments having a conic section or part-conic section have further advantages as with plastic materials such bushings with a lug can be manufactured cheaply by injection moulding.

The preferred embodiment of FIGS. 1, 2, 3 and 4 provide other advantages in that this form of lug is the strongest mechanically and is therefore more able to resist deformation and damage. With plastics materials injection moulded the die is of relatively simple construction and any moulding flash within the oil hole can be easily removed. In the case of the plastics or metal materials in which the bushing is formed by wrapping, this is the most practical insofar as conventional manufacturing techniques are concerned, as the oil hole and lug may be formed by the successive steps of drilling and pressing.

Further advantages of the present invention will be apparent to those skilled in the art especially in relation to the economics of manufacture and assembly.

I claim:

1. The combination of a bearing bushing and a housing, in which said bearing bushing embodies a bearing surface and an opposed surface adjacent said housing, two circumferentially spaced opposed faces extending transverse to the longitudinal axis of said bushing and at least partially along the length of said bushing to define a compensation gap interrupting said bearing surface, a lubricant passageway is formed in said housing, an opening is formed in said bushing and is in register with said lubricant passageway, and a locating lug provided in said bushing extends from at least part of the periphery of said opening outwardly of said opposed surface and engages within said passageway, the cross-section of said locating lug being sufficient to locate effectively, but small enough to permit flow of lubricant through said passageway and said opening to said bearing surface.

2. The combination of claim 1 in which said lug is of truncated conical configuration with a concentric bore defining said opening, and the cone angle $\theta$ is such that $\tan \theta/2$ is more than the coefficient of friction between said lug and said housing.

3. The combination of a bearing bushing and a housing according to claim 1 in which said bearing bushing is formed of a resiliently deformable material and the locating lug is tapered in a direction towards its outer end.

References Cited

UNITED STATES PATENTS 2,865,691  12/1958  Muller _____ 308—237

FOREIGN PATENTS 805,539  12/1958  Great Britain.
825,056  12/1959  Great Britain.
1,012,142  12/1965  Great Britain.

FRED C. MATTERN, JR., Primary Examiner

F. SUSKO, Assistant Examiner